US011107090B2

United States Patent
Ramamurthy et al.

(10) Patent No.: US 11,107,090 B2
(45) Date of Patent: Aug. 31, 2021

(54) SYSTEM AND METHOD FOR AUTOMATED CONTENT GENERATION

(71) Applicant: EPIANCE SOFTWARE PVT. LTD., Karnataka (IN)

(72) Inventors: Ravi Ramamurthy, Karnataka (IN); Ramgopal M Cillanki, Karnataka (IN)

(73) Assignee: EPIANCE SOFTWARE PVT. LTD., Bangalore (IN)

(*) Notice: Subject to any disclaimer, the term of this patent is extended or adjusted under 35 U.S.C. 154(b) by 330 days.

(21) Appl. No.: 15/614,656

(22) Filed: Jun. 6, 2017

(65) Prior Publication Data
US 2017/0353406 A1    Dec. 7, 2017

Related U.S. Application Data

(60) Provisional application No. 62/365,408, filed on Jul. 22, 2016.

(51) Int. Cl.
| | |
|---|---|
| G06Q 30/02 | (2012.01) |
| G06N 5/04 | (2006.01) |
| G06N 20/00 | (2019.01) |
| G06F 16/907 | (2019.01) |
| G06F 40/226 | (2020.01) |
| G06F 3/0484 | (2013.01) |
| H04L 12/58 | (2006.01) |

(52) U.S. Cl.
CPC ......... *G06Q 30/02* (2013.01); *G06F 3/04847* (2013.01); *G06F 16/907* (2019.01); *G06F 40/226* (2020.01); *G06N 5/043* (2013.01); *G06N 20/00* (2019.01); *H04L 51/02* (2013.01); *G06N 5/047* (2013.01)

(58) Field of Classification Search
CPC ............................... H04L 51/02; H04L 12/58
USPC ......................................................... 709/206
See application file for complete search history.

(56) References Cited

U.S. PATENT DOCUMENTS

| | | | |
|---|---|---|---|
| 2004/0181778 A1* | 9/2004 | Tibazarwa | G06F 8/315 717/115 |
| 2006/0184410 A1* | 8/2006 | Ramamurthy | G06Q 10/10 706/8 |
| 2013/0246424 A1* | 9/2013 | Deninger | G06N 5/02 707/737 |
| 2015/0310749 A1* | 10/2015 | Sergott | G09B 19/00 434/366 |
| 2017/0003937 A1* | 1/2017 | Huebra | G06F 8/20 |

* cited by examiner

*Primary Examiner* — Moustafa M Meky
*Assistant Examiner* — Sm Z Islam
(74) *Attorney, Agent, or Firm* — Prakash Nama; Global IP Services, PLLC (57) ABSTRACT

The present disclosure is related to automatic content generation. In one example, user interactions, associated with a target business process software application, are captured and stored. Further in this example, one or more scenarios of using the target business process software application are determined from the captured and stored user interactions. A set of rules are then formed and stored in a rules repository to generate the content. The content is then automatically generated using the captured and stored user interactions, the determined one or more scenarios of using the target business process software application and/or the stored set of rules.

21 Claims, 6 Drawing Sheets

FIG. 1

TABLE OF CONTENTS:

TEST CASE:..................................................................................................3
PROGRAM/MODULE/OBJECT UNDER TEST:.........................................3
TEST OBJECTIVE:........................................................................................3
TEST CONDITION:.......................................................................................3
WORK FLOW:...............................................................................................4
PROCEDURE:...............................................................................................5
EXPECTED RESULTS:...............................................................................10
ACTUAL RESULTS:....................................................................................10
DISCREPANCIES:.......................................................................................10
APPENDIX:..................................................................................................11

PROCESS CHANGE HISTORY:

PREVIOUS VERSION: 6.0
CURRENT VERSION: 6.5

1.       <u>UNCHANGED STEPS [1-3]</u>

5.  [ X ]  <u>SELECT THE [SPACES] CHECK BOX.</u>

6.       <u>UNCHANGED STEPS [6-7]</u>

8.* [ NEW ] <u>SELECT THE [ALL] CHECK BOX.</u>

9.       <u>UNCHANGED STEPS [9-14]</u>

| | |
|---|---|
| 302 | SELECT THE [TAB CHARACTERS] CHECK BOX. |
| 304 | SELECT THE [SPACES] CHECK BOX. [☒ DELETED STEP] |
| 306 | SELECT THE [HIDDEN TEXT] CHECK BOX. |
| 308 | SELECT THE [OPTIONAL HYPHENS] CHECK BOX. |
| 310 | SELECT THE [ALL] CHECK BOX [NEW]. |
| 312 | SELECT THE [OPTIONAL BREAKS] CHECK BOX. |
| 314 | CLICK [CANCEL]. |

SYSTEM AND METHOD FOR AUTOMATED CONTENT GENERATION

RELATED APPLICATIONS

Benefit is claimed under 35 U.S.C. 119(a)-(d) to Indian Application Serial No. 201641019441 filed on Jun. 6, 2016, entitled "INTELLIGENT INTERACTIVE SELF LEARNING BUSINESS PROCESS PERFORMANCE ENHANCER" and U.S. Provisional Application Ser. No. 62/365,408 filed on Jul. 22, 2016, entitled "INTELLIGENT INTERACTIVE SELF LEARNING BUSINESS PROCESS PERFORMANCE ENHANCER", by EPIANCE SOFTWARE PVT. LTD., which is herein incorporated in its entirety by reference for all purposes.

BACKGROUND

Creation of content for using software applications can be a very time-consuming process. Example content, may include training materials, presentation materials, performance materials, test and quality assurance materials and so on. Example training materials may include documents, user manuals, help files, videos, animations, and the like. Existing techniques for content creation may require a content developer/writer to work with software developers to understand and create the training materials. The content writer/developer may use some authoring and content development tools, which to some extent may reduce the effort required in creating the content. However, using such development tools may require a lot of repetitive manual acts to create the content. In addition, the content may have to be created in different languages, expertise levels, looks and feels, output formats and so on. This can result in requiring even more time to create the content.

BRIEF DESCRIPTION OF THE DRAWINGS

Examples are described in the following detailed description and in reference to the drawings, in which.

DETAILED DESCRIPTION

The automated content generator takes recordings of user interactions associated with software applications and translates them automatically into content in a needed file format for training materials, performance support documents, test and quality assurance documents and so on. Example formats include document file format (DOCX), power point file format (PPTX), portable document file format (PDF), flash video format (FLV), hypertext language format (HTML), audio video interleave format (AVI) and so on. The automated content generator further assists in speedy change management by automatically updating any needed changes/revisions to the created content.

Examples described herein may include various subsystems that may or may not be necessary and may be assembled as needed for any given business process.

The term "process" here refers to a "business process", such as a purchase order process, invoicing process, accounts receivable process and so on. Further, the term "user interactions" refers to human interface device (e.g., mouse, keyboard, trackpad and so on) actions performed by the user or a robot on displayed "textual and visual information", which may include graphical user interface (GUI) elements, character based interfaces and so on. Furthermore, example target business process software applications are SAP® applications, PeopleSoft® applications, SalesForce® applications, browser based software applications and so on.

Figure 1:
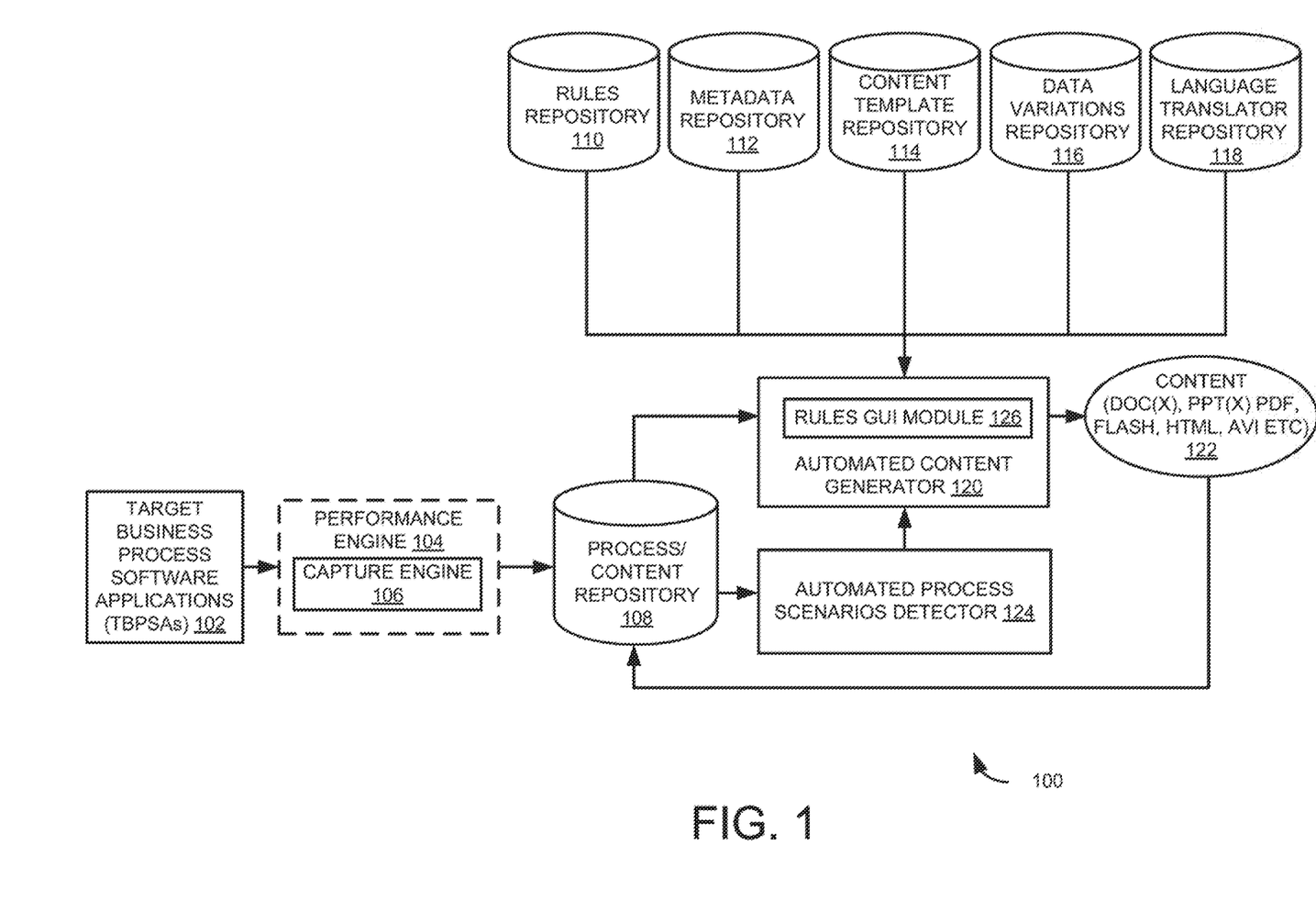
FIG. 1 is a block diagram illustrating an example implementation of an automatic content generation system.

Turning now to figures, FIG. 1 is a block diagram illustrating an example automatic content generation system 100. As shown in FIG. 1, the system 100 includes a capture engine 106 residing in a performance engine 104 that is communicatively coupled with target business process software applications 102. Further as shown in FIG. 1, the system 100 includes a process/content repository 108 that is communicatively coupled between the performance engine 104 and an automated process scenarios detector 124. Furthermore, as shown in FIG. 1, the system 100 includes an automated content generator 120 that is communicatively coupled with a rules repository 110, a metadata repository 112, a content template repository 114, a data variations repository 116 and a language translator repository 118, the automated process scenarios detector 124 and the process/content repository 108. In addition, as shown in FIG. 1, the output, which is content 122, from the automated content generator 120 is configured to store in the process/content repository 108.

Figure 3A:
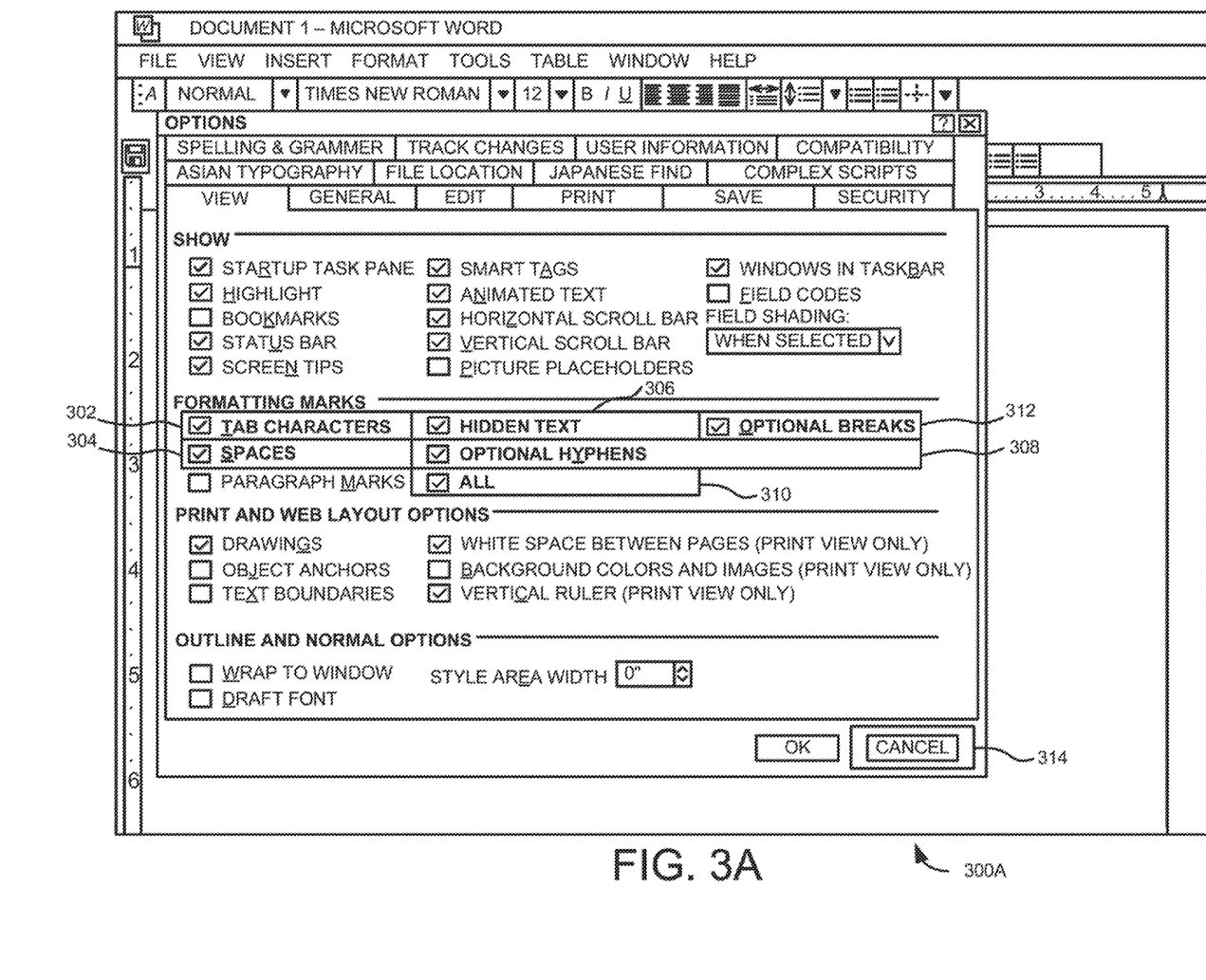
FIGS. 3A and 3B depict example content (screen shot showing the workflow process steps and a table showing the workflow process steps) generated by the automatic content generation system, such as shown in FIG. 1.

In operation, the capture engine 106 captures user interactions associated with the target business process software application 102 and stores the captured user interactions in the process/content repository 108. In some embodiments, the capture engine 106 captures a subject matter expert's (SME's) interactions associated with the target business process software application 102 and stores the captured SME's interactions in the process/content repository 108. Example user interactions comprise GUI element interactions, interacted GUI element information, all the GUI elements and other pertinent details presented on the display screen interacted by the user, screenshots of GUI and video of the user interactions with GUI. In some embodiments, the user interactions are stored in a GPS file format (i.e., Extensible Markup Language (xml) format). FIG. 3A shows example captured SME's user interactions 302-314 on a screenshot 300A associated with target business process software application 102.

The automated process scenarios detector 124 then determines one or more scenarios of using the target business process software application 102 from the captured and stored user interactions. For example, a business process can have several minor variations and scenarios for doing the same business task, such as creating a purchase order, invoicing and so on. In such scenarios, the performance engine 104 can take multiple instances of the process scripts and create an integrated process flow depicting various scenarios. The automated process scenarios detector 124 then determines and/or generates one or more scenarios of using the target business process software application to complete the same business task.

The rules GUI module 126 then allows a user to create a set of rules to form a desired content. In some embodiment, the rules GUI module 126 allows an SME to create the set of rules to form the desired content. In these embodiments, the rules GUI module stores the created set of rules in the rules repository 110. Further in these embodiments, the rules GUI module 126 allows a user to define flexible rules related to metadata and content generation. The rules may have reference to templates, languages, metadata, data variations and so on.

The metadata repository 112 may include metadata associated with the target business process software application 102. In some embodiments, metadata may include target business process software application user interaction factors associated with the user interactions with the target business process software application 102. Example target business process software application user interaction factors may include complexity, frequency of usage, application, domain, language, and geography. Example domain may include business operations, such as manufacturing, human resource (HR), finance, administration, engineering, sales, marketing, helpdesk and so on.

The content template repository 114 may include content layout data needed to generate the content. Example content layout data may include content orientation (i.e., landscape or portrait), whether to include table of contents, to include all instructions of a screen in a single page or on multiple pages, types of fonts to use, size of screen shot images, (i.e., thumbnail view or full screen view), video with or without animation and the like. For example, if the content is a video, then should there be transitions from one screen to another in the video or should the video just navigate without any animation. Also for example, table of contents may be followed by instructions for training on the business process, table of contents or all instructions of a display screen presented on a single page or different pages.

The data variations repository 116 may include example data needed for use in creating the content. For example, in a target business process software application 102, such as SAP®, in creating a purchase order, example data may include type of product, quantity of the product, vendor name, price of the product and so on. In such a scenario, training users to use the target business process software application 102, may require performing the same business process by using different example data (data variations) as follows:

Example 1: product=bicycle, quantity=2, vendor=ABC, Inc., price=$200

Example 2: product=boat, quantity=1, vendor=ABC, Inc., price=$3000

Example 3: product=shampoo, quantity=3, vendor=V, Inc., price=$30

The language translator repository 118 may include needed language translation information to generate content in desired one or more language formats. In some embodiments, the language translation information may be in the form of a look-up table. For example, the look-up table may include language translation information that allows translating from English language to French, German, Italian, Chinese, Japanese languages, or the like.

The automated content generator 120 then automatically generates the content in a desired format based on the captured user interactions, determined one or more scenarios and/or the created set of rules. In some embodiments, the automated content generator 120 also uses metadata, content layout data, data variations, and language translation information stored in the metadata repository 112, the content template repository 114, the data variations repository 116 and the language translation repository 118, respectively to automatically generate the desired content. In these embodiments, the automated content generator 120 may generate the content based on the rules and information stored in the rules repository 110, metadata repository 112, content template repository 114 and data variation repository 116.

Figure 2:
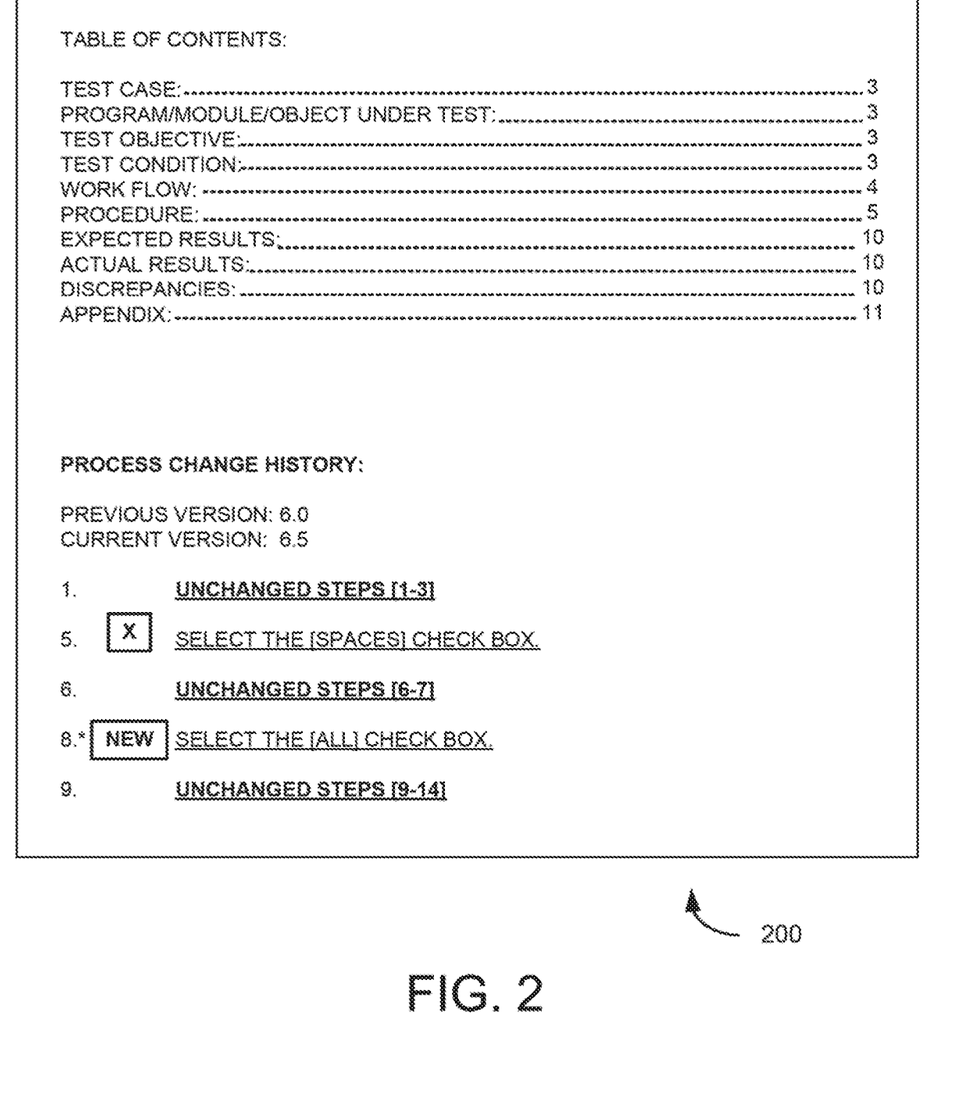
FIG. 2 depicts an example content (table of contents of a user manual) generated by the automatic content generation system, such as shown in FIG. 1.
Figure 3B:
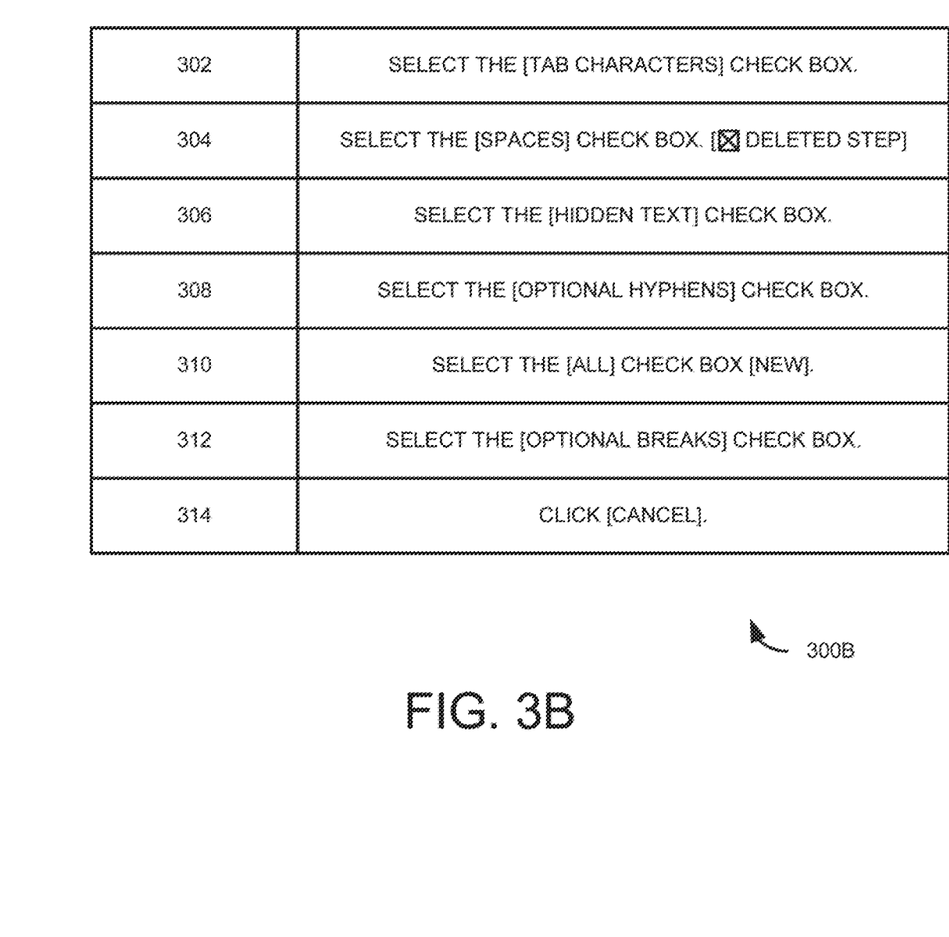

The automated content generator 120 may generate the content 122 in a file format, such as a document file format (DOCX), a power point file format (PPTX), a portable document file format (PDF), a flash video file format (FLV), a hypertext language file format (HTML), an audio video interleave file format (AVI) and so on. Example generated content may include training material, presentation material, test and performance material, and the like. In some embodiments, an entire repository of captured user interactions can be converted into very rich, meaningful, and variety of content types for several different business process usage scenarios. FIGS. 2 and 3B show example content that can be created by the automated content generator 120. FIG. 2 shows a table of contents 200 created by the automated content generator 120. FIG. 3B shows a table 300B including a series of instructions 302-314 to be followed in executing a business process when using the target business process software application 102.

Figure 4:
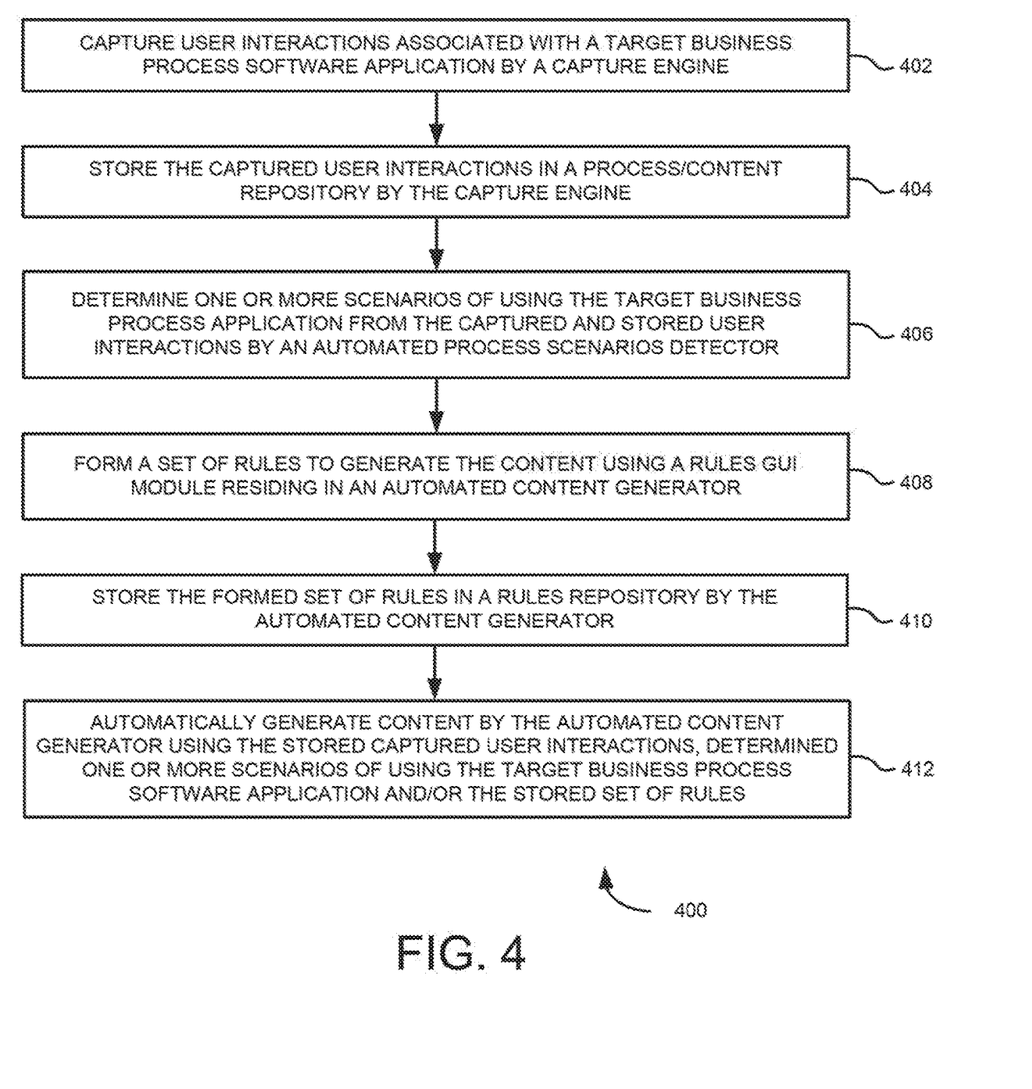
FIG. 4 depicts an example flow diagram of a method for automatic content generation.

FIG. 4 depicts an example flow chart 400 of a process for automatic content generation. It should be understood that the process depicted in FIG. 4 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate programs, or use a combination of hardware and program to perform the illustrated processes.

At 402, user interactions associated with a target business process software application are captured by a capture engine. At 404, the captured user interactions are stored in a process/content repository by the capture engine. At 406, one or more scenarios of using the target business process software application are determined from the captured and stored user interactions by an automated process scenarios detector. At 408, a set of rules are formed to generate content using a rules GUI module residing in an automated content generator. At 410, the formed set of rules are stored in a rules repository by the automated content generator. At 412, the content is automatically generated by the automated content generator using the captured and stored user interactions, the determined one or more scenarios of using the target business process software application and/or the stored set of rules. The process of automatic content generation is explained in more detail with reference to FIGS. 1-3B.

Figure 5:
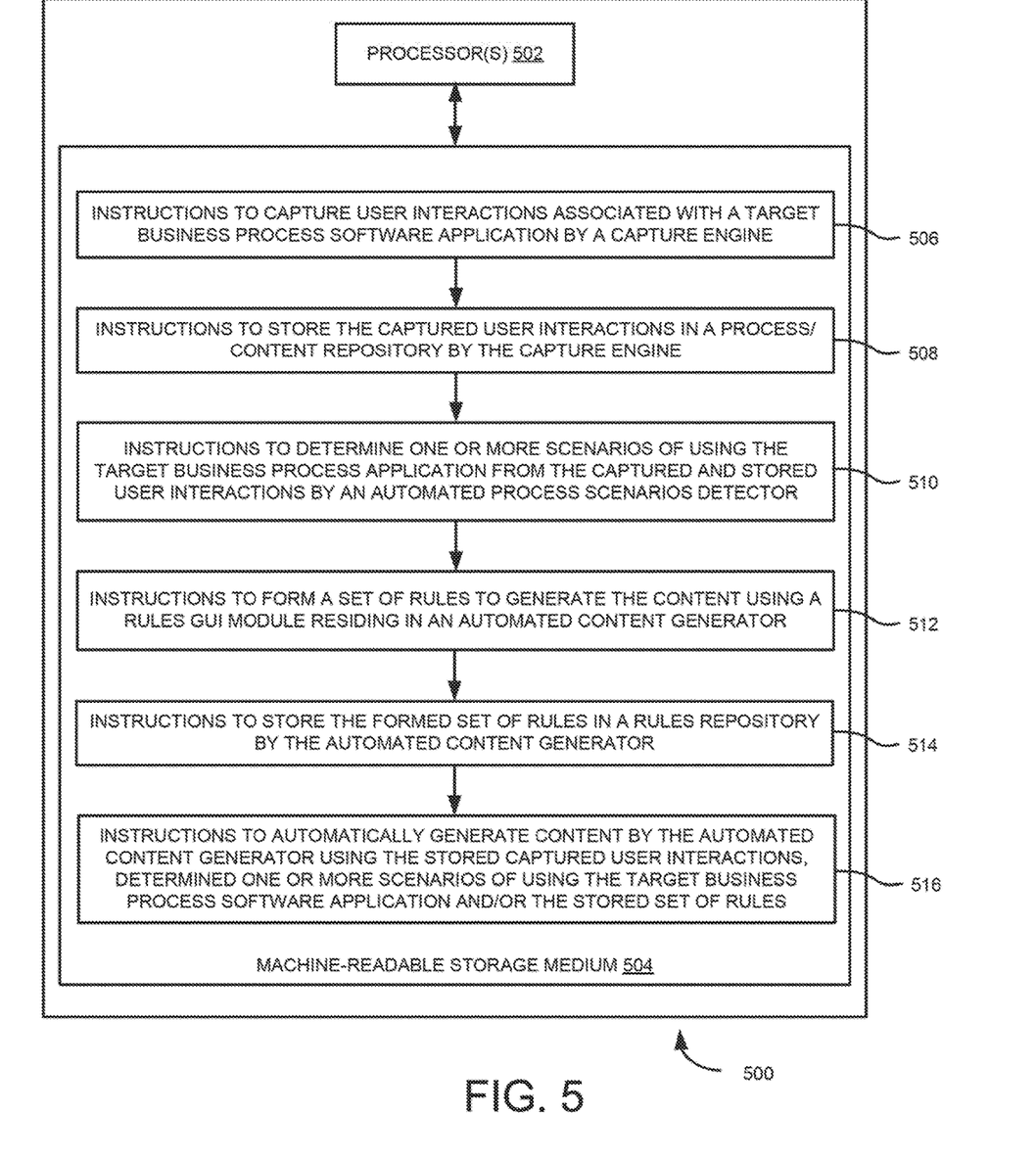
FIG. 5 is a block diagram of an example system including instructions in a machine-readable storage medium for automatic content generation.

FIG. 5 is a block diagram of an example system 500 including instructions in a machine-readable storage medium for automatic content generation. System 500 includes a processor 502 and a machine-readable storage medium 504 communicatively coupled through a system bus. In an example, system 500 may be analogous to a plurality of target business process software applications 102, a performance engine 104, a capture engine 106 and an automated content generator 120 of FIG. 1. Processor 502 may be any type of Central Processing Unit (CPU), microprocessor, or processing logic that interprets and executes machine-readable instructions stored in machine-readable storage medium 504. Machine-readable storage medium 504 may be a random-access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium.

Machine-readable storage medium 504 may store instructions 506, 508, 510, 512, 514, and 516. In an example, instructions 506 may be executed by processor 502 to capture user interactions associated with a target business process software application by a capture engine. Instructions 508 may be executed by processor 502 to store the captured user interactions in a process/content repository by the capture engine. Instructions 510 may be executed by processor 502 to determine one or more scenarios of using the target business process software application from the captured and stored user interactions by an automated process scenarios detector. Instructions 512 may be executed by processor 502 to form a set of rules to generate the content using a rules GUI module residing in an automated content generator. Instructions 514 may be executed by processor 502 to store the formed set of rules in a rules repository by the automated content generator. Instructions 516 may be executed by processor 502 to automatically generate content by the automated content generator using the stored captured user interactions, determined one or more scenarios of using the target business process software application and/or the stored set of rules. In an example, the instructions to automatically generate content may also comprise generating the content in a desired file format using stored metadata, content layout data, example data and/or language translation information.

For the purpose of simplicity of explanation, the example method of FIG. 4 is shown as executing serially, however it is to be understood and appreciated that the present and other examples are not limited by the illustrated order. The example system FIG. 1 and method FIG. 4 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

Although specific embodiments have been described above, these embodiments are not intended to limit the scope of the present disclosure, even where only a single embodiment is described with respect to a feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing detailed description, some features are grouped together in a single embodiment for streamlining the disclosure. This method of disclosure is not to be interpreted as reflecting an intention that the disclosed embodiments of the present disclosure must use more features than are expressly recited in each claim. Rather, as the following claims reflect, inventive subject matter lies in less than all features of a single disclosed embodiment. Thus, the following claims are hereby incorporated into the detailed description, with each claim standing on its own as a separate embodiment.

What is claimed is:

1. An automatic content generation system, comprising;
   a capture engine to capture user interactions associated with a business task of a target business process software application and to store the captured user interactions in a process/content repository, wherein the user interactions comprise human interface device actions performed on graphical user interface (GUI) elements associated with the business task;
   an automated process scenarios detector to determine multiple variations and scenarios to complete the business task from the captured and stored user interactions;
   a rules graphical user interface (GUI) module to allow a user to create a set of rules to generate content;
   rules repository to store the created set of rules;
   metadata repository to store metadata associated with the target business process software application;
   content template repository to store content layout data needed to generate the content;
   data variations repository to store example data needed to generate the content;
   a language translator repository to store needed language translation information to generate the content in desired one or more languages; and
   an automated content generator to automatically generate the content in a desired file format based on the captured user interactions, the determined multiple variations and scenarios, the created set of rules, the stored metadata, the stored content layout data, the stored example data, and the stored language translation information.

2. The system of claim 1, wherein the desired file format is selected from a group consisting of a document file format (DOCX), a power point file format (PPTX), a portable document file format (PDF), a flash video format (FLV), a hypertext language format (HTML), and an audio video interleave format (AVI).

3. The system of claim 1, wherein the metadata comprises target business process software application user interaction factors associated with the user interactions with the target business process software application and wherein the target business process software application user interaction factors are selected from a group consisting of complexity, frequency of usage, application, domain, language, and geography.

4. The system of claim 1, wherein the content layout data is selected from a group consisting of content orientation, whether to include table of contents, to include all instructions of a screen in a single page or on multiple pages, types of fonts to use, size of screen shot images, thumbnail view or full screen view, and video with or without animation.

5. The system of claim 1, wherein the user interactions comprise GUI element interactions, interacted GUI element information, all the GUI elements and other pertinent details presented on the display screen interacted by the user, screenshots of GUI and video of the user interactions with GUI.

6. The system of claim 1, wherein the content comprises training material, presentation material and/or test and performance material.

7. The system of claim 1, wherein the automated process scenarios detector to determine the multiple variations and scenarios by:
  obtaining multiple instances of process scripts associated with the captured and stored user interactions; and
  creating an integrated process flow using the process scripts, wherein the integrated process flow depicts the multiple variations and scenarios to complete the business task.

8. A method of automatic content generation, comprising:
  capturing user interactions associated with a business task of a target business process software application by a capture engine;
  storing the captured user interactions in a process/content repository by the capture engine, wherein the user interactions comprise human interface device actions performed on graphical user interface (GUI) elements associated with the business task;
  determining multiple variations and scenarios to complete the business task from the captured and stored user interactions by an automated process scenarios detector;
  creating a set of rules to generate content using a rules GUI module residing in an automated content generator;
  storing the created set of rules in a rules repository by the automated content generator;
  storing metadata associated with the target business process software application in metadata repository;
  storing content layout data needed to generate the content in content template repository;
  storing example data needed to generate the content in data variations repository;
  storing language translation information needed to generate the content in desired one or more languages in language translator repository; and
  automatically generating the content in a desired file format by the automated content generator using the captured and stored user interactions, the determined multiple variations and scenarios, the created set of rules the stored metadata, the stored content layout data, the stored example data, and the stored language translation information.

9. The method of claim 8, wherein the desired file format is selected from a group consisting of a document file format (DOCX), a power point file format (PPTX), a portable document file format (PDF), a flash video format (FLV), a hypertext language format (HTML), and an audio video interleave format (AVI).

10. The method of claim 8, wherein the metadata comprises target business process software application user interaction factors associated with the user interactions with the target business process software application, and wherein the target business process software application user interaction factors are selected from a group consisting of complexity, frequency of usage, application, domain, language, and geography.

11. The method of claim 8, wherein the content layout data is selected from a group consisting of content orientation, whether to include table of contents, to include all instructions of a screen in a single page or on multiple pages, types of fonts to use, size of screen shot images, thumbnail view or full screen view, and video with or without animation.

12. The method of claim 8, wherein the user interactions comprise GUI element interactions, interacted GUI element information, all the GUI elements and other pertinent details presented on the display screen interacted by the user, screenshots of GUI and video of the user interactions with GUI.

13. The method of claim 8, wherein the content comprises training material, presentation material and/or test and performance material.

14. The method of claim 8, wherein determining the multiple variations and scenarios to complete the business task from the captured and stored user interactions comprises:
  obtaining multiple instances of process scripts associated with the captured and stored user interactions; and
  creating an integrated process flow using the process scripts, wherein the integrated process flow depicts the multiple variations and scenarios to complete the business task.

15. A non-transitory machine-readable medium storing instructions executable by a processing resource to:
  capture user interactions associated with a business task of a target business process software application by a capture engine;
  store the captured user interactions in a process/content repository by the capture engine, wherein the user interactions comprise human interface device actions performed on graphical user interface (GUI) elements associated with the business task;
  determine multiple variations and scenarios to complete the business task from the captured and stored user interactions by an automated process scenarios detector;
  create a set of rules to generate content using a rules GUI module residing in an automated content generator;
  store the created set of rules in a rules repository by the automated content generator;
  store metadata associated with the target business process software application in metadata repository;
  store content layout data needed to generate the content in content template repository;
  store example data needed to generate the content in data variations repository;

store language translation information needed to generate the content in desired one or more languages in language translator repository; and automatically generate the content in a desired file format by the automated content generator using the captured and stored user interactions, the determined multiple variations and scenarios, the created set of rules, the stored metadata, the stored content layout data, the stored example data, and the stored language translation information.

16. The non-transitory machine-readable medium of claim 15, wherein the desired file format is selected from a group consisting of a document file format (DOCX), a power point file format (PPTX), a portable document file format (PDF), a flash video format (FLV), a hypertext language format (HTML), and an audio video interleave format (AVI).

17. The non-transitory machine-readable medium of claim 15, wherein the metadata comprises target business process software application user interaction factors associated with the user interactions with the target business process software application, and wherein the target business process software application user interaction factors are selected from a group consisting of complexity, frequency of usage, application, domain, language, and geography.

18. The non-transitory machine-readable medium of claim 15, wherein the content layout data is selected from a group consisting of content orientation, whether to include table of contents, to include all instructions of a screen in a single page or on multiple pages, types of fonts to use, size of screen shot images, thumbnail view or full screen view, and video with or without animation.

19. The non-transitory machine-readable medium of claim 15, wherein the user interactions comprise GUI element interactions, interacted GUI element information, all the GUI elements and other pertinent details presented on the display screen interacted by the user, screenshots of GUI and video of the user interactions with GUI.

20. The non-transitory machine-readable medium of claim 15, wherein the content comprises training material, presentation material and/or test and performance material.

21. The non-transitory machine-readable medium of claim 15, wherein instructions to determine the multiple variations and scenarios to complete the business task from the captured and stored user interactions comprise instructions to:

obtain multiple instances of process scripts associated with the captured and stored user interactions; and create an integrated process flow using the process scripts, wherein the integrated process flow depicts the multiple variations and scenarios to complete the business task.

* * * * *